United States Patent
Jerye

(10) Patent No.: US 9,203,797 B2
(45) Date of Patent: Dec. 1, 2015

(54) NETWORK COMPRISING A PLURALITY OF DEVICES AND ROOT DEVICE AND METHOD FOR ASSIGNING A NETWORK ADDRESS

(75) Inventor: Matthias Jerye, Fellbach (DE)

(73) Assignee: Sony Corporation, Tokyo (JP)

( * ) Notice: Subject to any disclaimer, the term of this patent is extended or adjusted under 35 U.S.C. 154(b) by 76 days.

(21) Appl. No.: 12/719,274

(22) Filed: Mar. 8, 2010

(65) Prior Publication Data

US 2010/0250716 A1    Sep. 30, 2010

(30) Foreign Application Priority Data

Mar. 31, 2009 (EP) ..................... 09156939

(51) Int. Cl.
| | | |
|---|---|---|
| G06F 15/16 | (2006.01) | |
| H04L 29/12 | (2006.01) | |
| H04L 12/939 | (2013.01) | |
| H04N 21/436 | (2011.01) | |
| H04N 21/6402 | (2011.01) | |

(52) U.S. Cl.
CPC ...... *H04L 61/2046* (2013.01); *H04L 29/12264* (2013.01); *H04L 49/557* (2013.01); *H04N 21/43615* (2013.01); *H04N 21/6402* (2013.01); H04L 29/12216 (2013.01); H04L 29/12254 (2013.01); H04L 61/2007 (2013.01); H04L 61/2038 (2013.01)

(58) Field of Classification Search
USPC ........................................................ 709/221
See application file for complete search history.

(56) References Cited

U.S. PATENT DOCUMENTS

| | | | | |
|---|---|---|---|---|
| 7,159,016 | B2 * | 1/2007 | Baker ........................... | 709/220 |
| 2002/0019743 | A1 * | 2/2002 | Nakamura ...................... | 705/1 |
| 2005/0021603 | A1 * | 1/2005 | Yokomitsu et al. ........... | 709/203 |
| 2005/0083859 | A1 | 4/2005 | Kang | |
| 2005/0207414 | A1 * | 9/2005 | Duvvury ....................... | 370/389 |
| 2006/0062176 | A1 * | 3/2006 | Ikemura et al. ............... | 370/328 |
| 2006/0203721 | A1 * | 9/2006 | Hsieh et al. ................... | 370/229 |
| 2006/0233175 | A1 * | 10/2006 | Ge et al. ........................ | 370/392 |
| 2006/0265401 | A1 * | 11/2006 | Edmond et al. ................ | 707/10 |
| 2007/0211690 | A1 * | 9/2007 | van Megen et al. ........... | 370/351 |
| 2008/0126577 | A1 | 5/2008 | Bae et al. | |
| 2008/0195857 | A1 | 8/2008 | Douillet | |
| 2008/0270632 | A1 | 10/2008 | Hong et al. | |
| 2009/0047948 | A1 * | 2/2009 | Turetsky et al. ........... | 455/432.1 |
| 2009/0074040 | A1 * | 3/2009 | Lida et al. ..................... | 375/220 |
| 2009/0147782 | A1 * | 6/2009 | Mank ............................. | 370/389 |
| 2011/0184815 | A1 * | 7/2011 | Song ........................... | 705/14.69 |
| 2011/0225302 | A1 * | 9/2011 | Park et al. ..................... | 709/227 |
| 2013/0124689 | A1 * | 5/2013 | De et al. ....................... | 709/219 |

FOREIGN PATENT DOCUMENTS

| | | |
|---|---|---|
| CN | 1514593 A | 7/2004 |
| RU | 2 329 531 C2 | 7/2008 |

OTHER PUBLICATIONS

Herb McBride, MCSE—tcpip.doc, May 31, 1998.*

(Continued)

*Primary Examiner* — Lance Leonard Barry
*Assistant Examiner* — Keyvan Emdadi
(74) *Attorney, Agent, or Firm* — Oblon, McClelland, Maier & Neustadt, L.L.P.

(57) ABSTRACT

The present invention relates to a network comprising one or more devices, each device having an address, said address comprising a device address being unique for each device within said network and a network address being common to all devices within said network.

The present invention further relates to a root device and a method for assigning the network address to the devices.

17 Claims, 4 Drawing Sheets

(56) References Cited

OTHER PUBLICATIONS

TCP/IP—McBride, 1998.*
Herb McBride TCP/IP.*

Office Action issued Aug. 3, 2012 in Chinese Patent Application No. 201010159263.9 (with English-language translation).
Office Action issued Feb. 25, 2014 in Russian Application No. 2010111163 (English Translation).

* cited by examiner

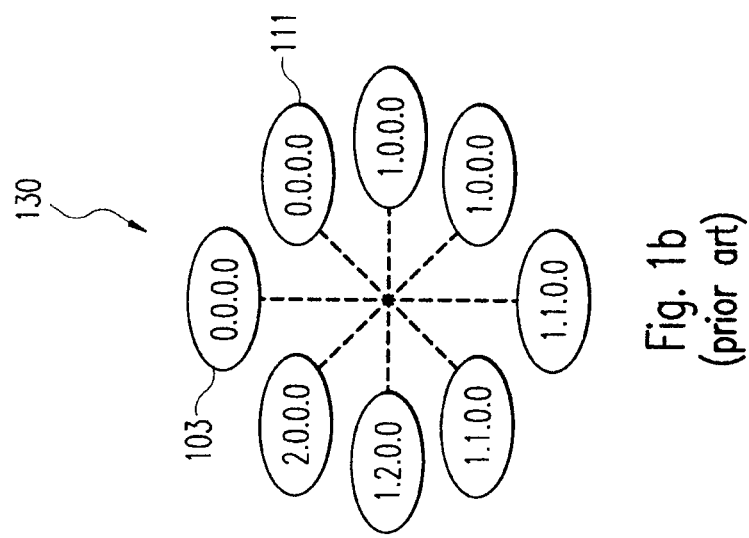
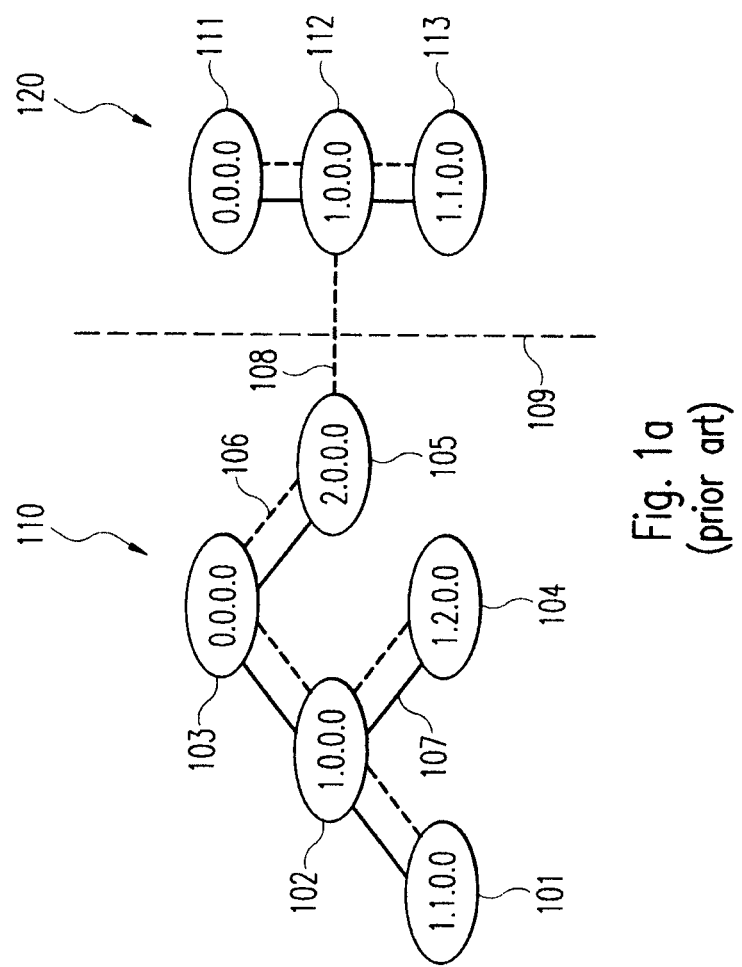
Fig. 1b (prior art)
Fig. 1a (prior art)

ions, this method
NETWORK COMPRISING A PLURALITY OF DEVICES AND ROOT DEVICE AND METHOD FOR ASSIGNING A NETWORK ADDRESS The present invention relates to the field of assigning addresses to a plurality of devices within a network. Specifically, the present invention relates to the field of avoiding address conflicts when connecting several networks to each other.

The connection of devices and forming networks becomes increasingly important, specifically in the field of consumer electronic devices. Several types of networks are provided and can be used, whereby a major aim is always to simplify the handling for the user and to provide at the same time a wide variety of possibilities of connecting the devices.

FIG. 1a shows two networks 110, 120 which are connected to each other. The networks 110, 120 can for example be networks connected according to High Definition Multimedia Interface Consumer Electronics Control (HDMI CEC) standard. That means that within the first network 120 several consumer electronic devices 101, 102, 103, 104, 105 are connected thereby forming a CEC network. The CEC line or CEC bus 107 is indicated with a drawn through line. Additionally, the devices 101, 102, 103, 104, 105 are connected to each other via a TCP/IP connection 106 shown with dashed lines.

Likewise, the second network 120 comprises several devices 111, 112, 113 which can communicate according to the CEC and/or TCP/IP standard.

As shown in FIG. 1a, each of the devices 101, 102, 103, 104, 105, 111, 112, 113 within each network 110, 120 comprises an address, for example 0.0.0.0.

If now the two networks 110, 120 are connected by a connection line 108 (whereby the two networks are schematically separated by line 109 in FIG. 1a), then problems will arise with the communication, since one or more addresses of devices 101, 102, 103, 104, 105, 111, 112, 113 within the networks 110, 120 are provided double. It is therefore not possible anymore to unambiguously identify the address of a device 101, 102, 103, 104, 105, 111, 112, 113 within the system 130 of the two connected networks 110, 120.

This is also shown in FIG. 1b. In FIG. 1b it is assumed that the devices 101, 102, 103, 104, 105, 111, 112, 113 are all capable of communicate via the TCP/IP connection and so a direct communication between all the devices 101, 102, 103, 104, 105, 111, 112, 113 in the system 130 would be possible if the devices could be unambiguously identified. For example the device 103 of the first network 110 and the device 111 of the second network 120 within the system 130 now have the same address, which therefore prevents a proper communication.

A possibility of managing conflicting addresses is shown in document US 2008/0126577 A1. In this document the address of one apparatus is acquired and then it is determined whether or not the acquired address and an address of a further external apparatus connected to the apparatus collide. If conflicting addresses are detected, then the address of one of the conflicting apparatuses is changed.

This method is very time and resource consuming, since conflicting addresses always have to be checked and since addresses then have to be changed. Further, in case that fixed addresses have to be provided for the devices, this method will not work.

It is therefore the object of the present invention to improve the prior art. Specifically, it is the object of the present invention to reduce the problems posed by the prior art.

More specifically, it is the object of the present invention to provide a possibility to avoid address conflicts in a simple and effective way.

This object is solved by the features of the independent claims.

Further embodiments and advantages are set out in the dependent claims.

Further features, advantages and objects of the present invention will become evident by means of the figures of the enclosed drawings as well as by the following detailed explanation of illustrative-only embodiments of the present invention.

FIGS. 1a and 1b show a schematic block diagram of prior art networks,

According to the present invention within each network the devices are identified by two address components. One is the device address which is unique for each device within the network. Additionally, according to the present invention a network address being common to all devices within the network is assigned to the devices. Each device within the network thus has an address comprising said device address being unique for each device and a network address being common to all devices within the network.

According to the present invention thus to the device addresses a sort of supplement is added indicating the network to which the different devices belong. Thereby it is ensured that if two or more networks are connected, even if the device addresses of devices in the different networks are identical, the complete address comprising the device address and the network address allows an unambiguous identification of each device within all connected networks.

Figure 2A:
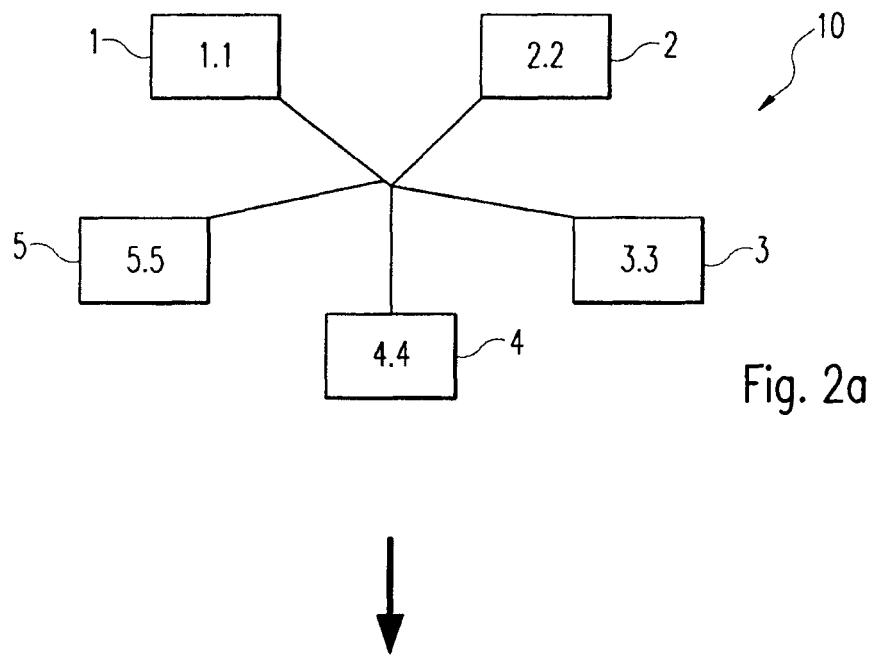
FIGS. 2a and 2b show schematic block diagrams of a network according to the present invention.
Figure 2B:
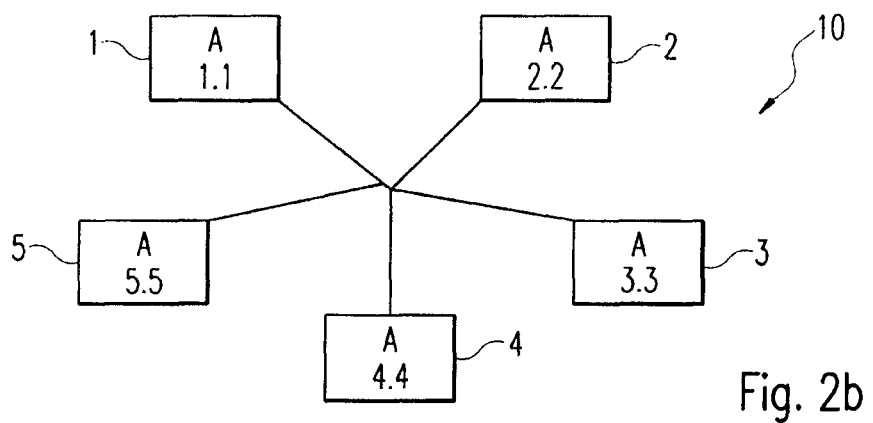

In FIG. 2a a network 10 is shown before the assignment of the network address and in FIG. 2b a network 10 is shown after the assignment of the network address A.

The network 10 comprises a plurality of devices 1, 2, 3, 4, 5 wherein each device 1, 2, 3, 4, 5 has a device address 1.1, 2.2, 3.3, 4.4, 5.5 being unique for each device 1, 2, 3, 4, 5 within the network 10.

Preferably, within each network 10 a root device is provided. As an example in the following the device 1 will be regarded as the root device 1. However, it is to be noted that this is only an example for simplifying the following explanation and that dependent on the used network protocol; also each of the other devices 2, 3, 4, 5 can be the root device 1.

The root device 1 is adapted to carry out all necessary steps and features for enabling the address handling within the network 10. As soon as the network 10 is either powered up or connected or the like, the root device 1 will assign a unique network address A to the devices 1, 2, 3, 4, 5 within network 10. This is shown in FIG. 2b, where each device 1, 2, 3, 4, 5 in addition to its unique device address 1.1, 2.2, 3.3, 4.4, 5.5 also has a network address A being common to all devices 1, 2, 3, 4, 5 within the network 10.

Since all devices 1, 2, 3, 4, 5 of the network 10 as soon as the network 10 is activated, will receive a network address A in addition to their device address 1.1, 2.2, 3.3, 4.4, 5.5, it is ensured that any connection of the network 10 to any other network or device will be accomplished after the assignment of a unique network address A.

In a preferred embodiment the network 10 is a network according to High Definition Multimedia Interface Consumer Electronics Control (HDMI CEC) standard. In an alternative embodiment, the network can be implemented according to a combination of HDMI and Ethernet standard thereby comprising communication lines between the devices according to the CEC standard and additionally according to the TCP/IP protocol. Consequently, the addresses within the network can be CEC addresses and/or IP addresses.

But the present invention is not limited to the HDMI CEC standard, the combination of HDMI with Ethernet or an Ethernet connection but can be applied to any type of network, where each device has at least one device address being unique for the respective device within the network. The device address hereby can be either static or dynamic.

As network address any type of address or number can be used, for example a MAC address can be used, a serial number or any arbitrary static number. It is further possible that the network address A is randomly generated. This reduces the probability, that two networks which are connected have the same network address, which then again would result in address conflicts.

The network address A can also be manually set by a user for each network in order to avoid address conflicts.

The root device 1 is further adapted to repeat the step of assigning a network address A in order to assign a new network address A. For example in the case where the network 10 is connected to a further network and in case this further network has the same network address A as the present network 10, then the root device 1 will assign a new network address to all devices 1, 2, 3, 4, 5 within the network 10 in order to avoid address conflicts. Preferably, also the other root device of the further network will assign a new address.

Figure 3B:
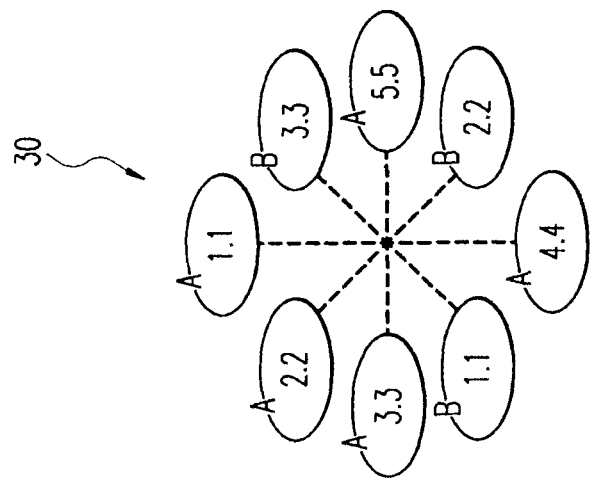
FIGS. 3a and 3b show a system comprising two connected networks according to the present invention.
Figure 3A:
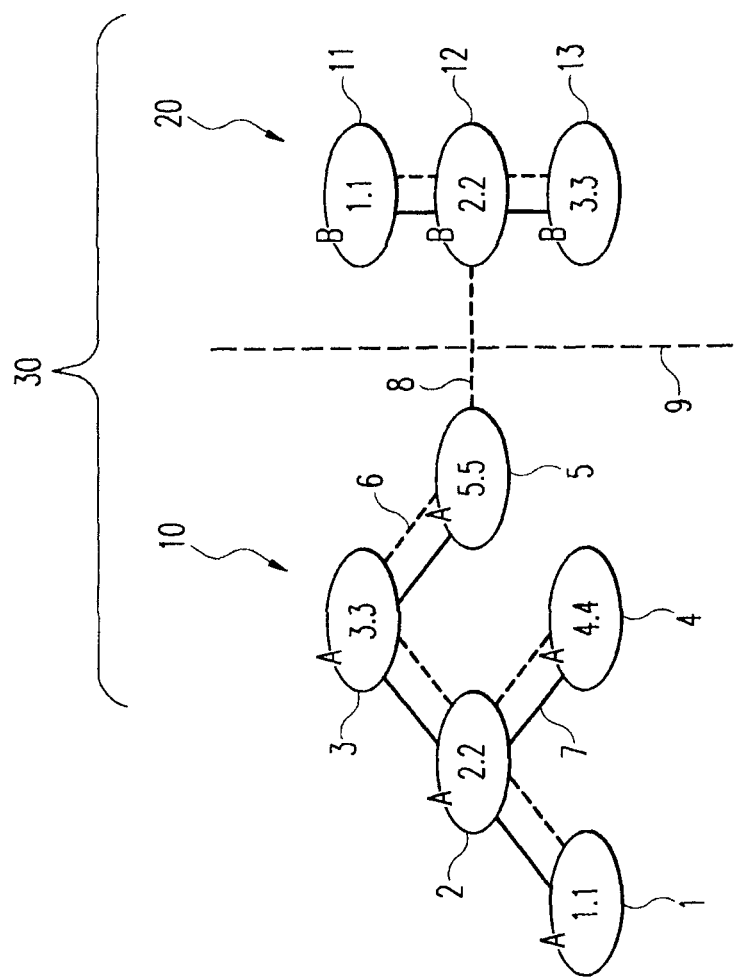

FIGS. 3a and 3b show an example of a system 30 comprising two networks 10, 20 according to the present invention. The network 10 comprises several devices 1, 2, 3, 4, 5, each device having a device address 1.1, 2.2, 3.3, 4.4, 5.5 being unique for each device 1, 2, 3, 4, 5 within the network 10. The devices 1, 2, 3, 4, 5 within the network 10 additionally have a network address A being common to all devices 1, 2, 3, 4, 5 within the network 10.

Likewise, the further network 20 comprises devices 11, 12, 13 each having a device address 1.1, 2.2, 3.3 being unique for each device 11, 12, 13 within the further network 20. Additionally, each device 11, 12, 13 within the further network 20 has a network address B being common to all devices 11, 12, 13 within the further network 20.

If the network 10 and the further network 20 are now connected thereby forming a system 30 of networks, every device 1, 2, 3, 4, 5, 11, 12, 13 within the system 30 can be unambiguously identified due to its address comprising the network address A, B and the device address 1.1, 2.2, 3.3, 4.4, 5.5.

Generally, in case that the devices 1, 2, 3, 4, 5, 11, 12, 13 within a network 10, 20 are adapted to communicate according to a first communication standard (first communication line 7 is shown with drawn through line) and according to a second communication standard (second communication line 6 is shown with a dashed line), and in case the networks are connected by a connection line 8 according to the second communication standard, then all devices 1, 2, 3, 4, 5, 11, 12, 13 can switch to a communication according to the second communication standard. Since only the devices 1, 2, 3, 4, 5, 11, 12, 13 within one network 10, 20 can additionally communicate according to the first communication standard, the devices 1, 2, 3, 4, 5, 11, 12, 13 within the system 30 in a preferred embodiment will choose to communicate via the communication standard which is common to all devices 1, 2, 3, 4, 5, 11, 12, 13, i.e. via the second communication standard.

Alternatively, dependent on the application and the requirements, it is also possible that the devices 1, 2, 3, 4, 5, 11, 12, 13 within one network 10, 20 communicate according to the first communication standard and that only the devices 5, 12 connecting the two networks 10, 20 communicate according to the first communication standard. The devices 5, 12 connecting the networks 10, 20 thus translate the messages between the two different communication standards.

In a preferred embodiment according to the present invention the network 10 and the further network 20 are networks based on a combination of HDMI with Ethernet. The devices within each network therefore can communicate via a CEC line 7, which is shown as drawn through line in the Figure, and additionally can communicate via TCP/IP line 6, which is shown as dashed line in the Figure. The two networks 10, 20 are connected to each other, either by connecting only one device 5 of the network 10 and one device 12 of the further network 20 or by connecting more devices.

In the case of a connection based on a combination of HDMI with Ethernet, the device 5 of the network 10 and the device 12 of the further network 20 for example be connected via the TCP/IP connection line 8. The devices 1, 2, 3, 4, 5, 11, 12, 13 within the system can then either all switch to the communication based on the Ethernet connection (as schematically indicated in FIG. 3b) or only the connected devices 5, 12 can communicate based in the Ethernet connection and the devices within the network 10 and the further network 20 on the other hand communicate by using the CEC line 7.

Figure 4:
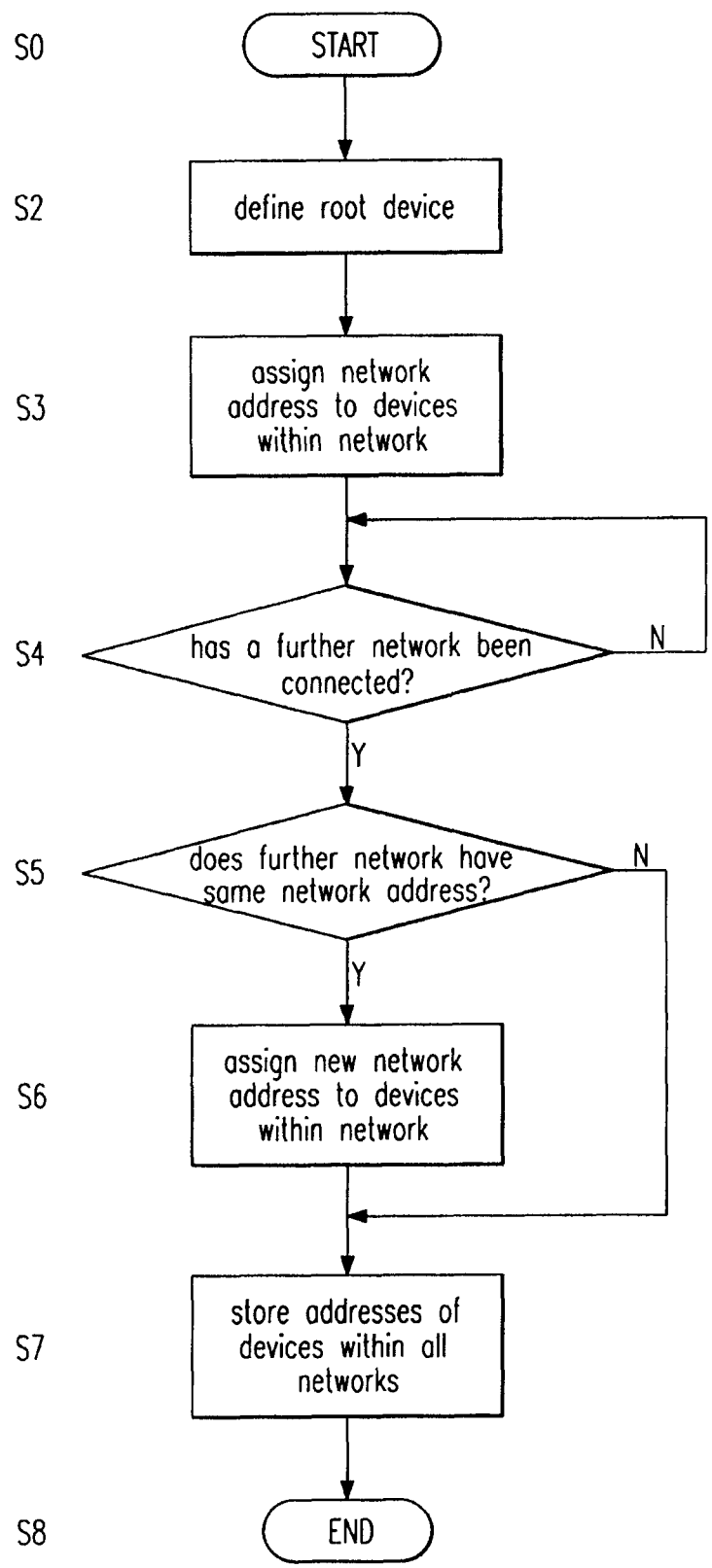
FIG. 4 shows a flow chart showing the steps according to the method of the present invention.

With reference to FIG. 4 now an overview over the process steps according to the method of the present invention will be given.

The method starts in step S0 for example with powering on the devices 1, 2, 3, 4, 5 or with connecting the devices 1, 2, 3, 4, 5 to a network 10.

In the following step S2 the root device 1 is defined. This can be accomplished dependent on the communication standard. For example the devices within the network 10 can negotiate and thereby define the root device 1. Alternatively, in the case of a CEC standard, if a TV is present, then the TV will always be the root device 1.

In the following step S3 a network address A is assigned by the root device 1 to all the devices 1, 2, 3, 4, 5 within the network 10. The network address A is thus assigned in addition to the device addresses 1.1, 2.2, 3.3, 4.4, 5.5.

In the following step S4 it is checked whether a further network 20 has been connected. If this is not the case then the process continues with a state waiting for a connection of a further network 20 and in the meantime the normal processing within the network 10 can be accomplished.

If in step S4 it is detected that a further network 20 was connected, then in the following step S5 it is decided whether the further network 20 has the same network address A. For example upon connection the two connected devices 5, 12 will exchange the network addresses A, B and the device addresses so that the root device 1 of each network 10, 20 can decide whether the other network or any other connected network has the same network address.

If conflicting network addresses are detected then in the following step S6 the root device 1 of each network having a conflicting network address will assign a new network address to the devices within the network 10, 20.

Otherwise, if in step S5 it is detected that none of the further networks has the same network address A, then the process continues with step S7, where the addresses of all devices 1, 2, 3, 4, 5, 11, 12, 13 within the system 30 comprising all connected networks 10, 20 are stored. The stored address hereby comprises the device addresses as well as the network addresses A, B.

The process ends in step S8 for example with starting the communication between the devices, which can now be unambiguously identified.

Several examples and applications of the present invention will be given in the following.

The devices 1, 2, 3, 4, 5, 11, 12, 13 according to the present invention in the preferred embodiment of a network based on a combination of HDMI with Ethernet are consumer electronic devices, such as a TV, a set top box (STB), a DVD or HDD recorder, a tuner or the like or generally any type of recording device and/or playback device. With the possibility of enabling an unambiguous identification of each device within the network, cross-network communication becomes possible.

For example the recording operation can be started in any device within the system 30, and thus dependent on the amount of recording space needed a corresponding remote recording device can be used. In another example it is possible to split up the function of receiving and recording depending on the actual needs.

Additionally, when media server are started the playback can be accomplished at the same time at different locations, e.g. within different rooms.

Further, messages and/or commands can be sent between devices of different networks. For example, one device within a first network can send a power up command to a device within a connected second network. In the specific embodiment of a combination of HDMI with Ethernet such a command can be accomplished based on a direct TCP/IP connection. Alternatively, the command can only be transmitted between the connected devices via the TCP/IP connection and the transmission within the network is again accomplished according to the CEC standard. In the case of a power up command this has the advantage that it is more power saving. If the devices are only powered up by a corresponding CEC command, it is possible to keep the devices in a low power consumption state, since CEC has a low clock signal. Therefore, only the devices, via which the networks are connected, have to be kept in a higher power state due to the TCP/IP connection.

The present invention is not limited to a system 30 of two connected networks 10, 20 but can be applied to any number of connected networks. Further, a network in the context of the present invention is intended to refer also to one single device. The present invention is not limited to the described embodiments, but features, components and/or method steps of one embodiments of the present invention can be incorporated into other embodiments, where appropriate.

With the present invention it becomes thus possible to connect devices within different networks and to send data, information or messages between the devices of the different networks, since each device is unambiguously identified.

The invention claimed is:

1. A system, comprising:
    at least two networks, each of said networks including one or more devices, each of said devices being assigned a device address being unique for said respective device within said respective network in which said device is included and a network address being common to devices within said respective network, the device address and the network address being separately provided and assigned to said respective device, wherein said one or more devices within each of said networks directly communicate over a first communication link according to the Consumer Electronics Control (CEC) protocol and over a second communication link according to an Internet protocol,
    a connection between said networks is based on said Internet protocol, and
    a particular device of the one or more devices in each of the networks is designated as a root device that assigns the network address of the respective network to the one or more devices on the respective network and replace the network address with a new network address when another network having a same network address as the network address is detected.

2. The system according to claim 1,
    wherein said device address is one or combination of a CEC address and an IP address, and
    wherein said network address is a MAC address, a serial number, an arbitrary static number, or a randomly generated static number.

3. The system according to claim 1 or 2, wherein each of said networks has a unique network address assigned to said one or more devices within said respective network.

4. The system according to claim 1, wherein at least one of the root devices repeats the step of assigning the network address thereby assigning a new network address.

5. A method of communicating between devices of two connected networks, each of said networks comprising one or more devices, wherein each of the devices is assigned a device address being unique for said respective device within said respective network in which the device is included and a network address being common to devices within said respective network, the method comprising:
    assigning, to the one or more devices on each of the networks, the network address of the respective network by a root device that is a designated one of the one or more devices in the respective network, each of said devices being unambiguously identified for communication with the device address and the network address of the respective device, the device address and the network address of the respective device being separately provided and assigned to said respective device;
    replacing, by the root device, the network address with a new network address when another network having a same network address as the network address is detected,
    providing communication between said one or more devices within each of said networks according to the Consumer Electronics Control (CEC) protocol and according to an Internet protocol, the devices to directly communicating over a first communication link according to the CEC protocol and to communicating over a second communication link according to the Internet protocol; and
    providing a connection between said networks according to said Internet protocol.

6. The method according to claim 5, further comprising:
    repeating said step of assigning by at least one of the root devices thereby assigning a new network address.

7. The method according to claim 5, wherein the step of assigning comprises:
    assigning as said network address a MAC address, a serial number, an arbitrary static number, or a randomly generated static number.

8. The method according to claim 5, further comprising:
    switching said communication between said devices to said Internet protocol that is common to said devices.

9. The method according to claim 5, further comprising:
providing a communication between devices within one network according to said CEC protocol; and
providing a communication between said devices connecting said networks according to said Internet protocol.

10. The system of claim 1, wherein said devices within said system switch to said Internet protocol that is common to said devices within said system.

11. The system of claim 1, wherein devices within one network communicate according to said CEC protocol, and said communication between said devices connecting said networks is accomplished according to said Internet protocol.

12. The system of claim 1, wherein the connection between said networks is based only on said Internet protocol.

13. The system of claim 1, wherein the first and second communication links are provided by different communications lines in an HDMI with Ethernet connection.

14. The system of claim 1, wherein the address comprising the network address and the device address, for each of the devices, identifies the respective device for communication over each of the first and second communication links.

15. The system of claim 1, wherein each root device is configured to generate or execute a CEC command.

16. The system of claim 1, wherein each root device is a CEC root device.

17. An information processing apparatus, comprising:
circuitry configured to
connect to one of at least two networks, each of said networks including one or more devices, each of said devices being assigned a device address being unique for said respective device within said respective network in which the device is included and a network address being common to devices within said respective network;
assign, to the one or more devices on the one of the at least two networks, the network address of the connected one of the at least two networks by a root device that is a designated one of the one or more devices in the connected network, each of said devices being unambiguously identified for communication with the device address and the network address of the respective device, the device address and the network address of the respective device being separately provided and assigned to said respective device; and
replace, by the root device, the network address with a new network address when another network having a same network address as the network address is detected, wherein
said one or more devices within each of said networks are adapted to directly communicate over a first communication link according to the Consumer Electronics Control (CEC) protocol and over a second communication link according to an Internet protocol, and
a connection between said networks is based on said Internet protocol.

* * * * *